US010319368B2

(12) United States Patent
Ushio et al.

(10) Patent No.: US 10,319,368 B2
(45) Date of Patent: Jun. 11, 2019

(54) MEANING GENERATION METHOD, MEANING GENERATION APPARATUS, AND STORAGE MEDIUM

(71) Applicant: Panasonic Intellectual Property Management Co., Ltd., Osaka (JP)

(72) Inventors: Takashi Ushio, Tokyo (JP); Katsuyoshi Yamagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/618,383

(22) Filed: Jun. 9, 2017

(65) Prior Publication Data

US 2017/0365252 A1    Dec. 21, 2017

(30) Foreign Application Priority Data

Jun. 17, 2016 (JP) .................................. 2016-120983
Jan. 19, 2017 (JP) .................................. 2017-007869

(51) Int. Cl.

| | |
|---|---|
| *G10L 15/16* | (2006.01) |
| *G10L 15/06* | (2013.01) |
| *G10L 15/18* | (2013.01) |
| *G06F 17/27* | (2006.01) |
| *G06N 3/04* | (2006.01) |

(52) U.S. Cl.
CPC ........ *G10L 15/063* (2013.01); *G06F 17/2785* (2013.01); *G06N 3/0445* (2013.01); *G10L 15/16* (2013.01); *G10L 15/1815* (2013.01)

(58) Field of Classification Search
CPC combination set(s) only.
See application file for complete search history.

(56) References Cited

U.S. PATENT DOCUMENTS

| | | | |
|---|---|---|---|
| 6,178,398 B1* | 1/2001 | Peterson | G10L 15/1822 |
| | | | 704/232 |
| 2017/0076716 A1* | 3/2017 | Lee | G10L 15/063 |
| 2017/0200081 A1* | 7/2017 | Allen | G06N 5/02 |

FOREIGN PATENT DOCUMENTS

JP    2011-257878    12/2011

OTHER PUBLICATIONS

Andrew M. Dai et al., "Semi-supervised Sequence Learning", NIPS 2015, Dec. 7, 2015.

(Continued)

*Primary Examiner* — Abul K Azad
(74) *Attorney, Agent, or Firm* — Greenblum & Bernstein, P.L.C.

(57) ABSTRACT

A meaning generation method, in a meaning generation apparatus, includes acquiring meaning training data including text data of a sentence that can be an utterance sentence and meaning information indicating a meaning of the sentence and associated with the text data of the sentence, acquiring restatement training data including the text data of the sentence and text data of a restatement sentence of the sentence, and learning association between the utterance sentence and the meaning information and the restatement sentence. The learning includes learning of a degree of importance of a word included in the utterance sentence, and the learning is performed by applying the meaning training data and the restatement training data to a common model, and storing a result of the learning as learning result information.

6 Claims, 10 Drawing Sheets

(56) References Cited

OTHER PUBLICATIONS

Ilya Sutskever et al., "Sequence to Sequence Learning with Neural Networks", NIPS 2014, Dec. 8-13, 2014.
Katja Filippova et al., "Sentence Compression by Deletion with LSTMs", EMNLP2015, pp. 360-368, Sep. 17, 2015.
Extended European Search Report, dated Nov. 21, 2017 from the European Patent Office (EPO), for the related European Patent Application No. 17173957.6.
Jianpeng Cheng et al., "Syntax-Aware Multi-Sense Word Embeddings for Deep Compositional Models of Meaning", Proceedings of the 2015 Conference on Empirical Methods in Natural Language Processing, Lisbon, Portugal, Sep. 17-21, 2015, Sep. 2015 (Sep. 21, 2015), pp. 1531-1542, XP0554237 44.

\* cited by examiner

FIG. 4

| MEANING INFORMATION | SENTENCE ID | SENTENCE |
|---|---|---|
| SNORE | 0001 | I HAVE A SNORE. |
| SNORE | 0002 | A SNORE OCCURS. |
| SNORE | 0003 | MY SNORE IS TERRIBLE. |
| ... | ... | ... |
| HEADACHE | 0031 | I HAVE A SPLITTING HEADACHE. |
| HEADACHE | 0032 | I HAVE A THROBBING HEADACHE. |
| HEADACHE | 0033 | I HAVE A TERRIBLE HEADACHE. |
| ... | ... | ... |
| STOMACHACHE | 0041 | I HAVE A THROBBING STOMACHACHE. |
| ... | ... | ... |

FIG. 5

| SENTENCE ID | SENTENCE | RESTATEMENT SENTENCE |
|---|---|---|
| 0001 | I HAVE A SNORE. | • A SNORE OCCURS<br>• MY SNORE IS TERRIBLE<br>... |
| 0002 | A SNORE OCCURS. | • I HAVE A SNORE.<br>• MY SNORE IS TERRIBLE.<br>... |
| ... | ... | ... |

FIG. 7

VOCABULARY
DIMENSIONAL VECTOR $x_1 = A$ $= (0,0,0,0,0,1,0,0,\cdots,0)$
$x_2 = $ SNORE $= (0,0,0,0,0,0,1,0,\cdots,0)$
$x_3 = $ OCCURS $= (0,0,0,0,0,0,0,1,\cdots,0)$
EOS $= (0,0,0,0,0,0,0,0,\cdots,1)$ $z_1 = I$ $= (0,0,0,1,0,0,0,0,\cdots,0)$
$z_2 = $ HAVE $= (0,0,0,0,1,0,0,0,\cdots,0)$
$z_3 = A$ $= (0,0,0,0,0,1,0,0,\cdots,0)$
$z_4 = $ SNORE $= (0,0,0,0,0,0,1,0,\cdots,0)$
$z_5 = $ EOS $= (0,0,0,0,0,0,0,0,\cdots,1)$

LABEL VECTOR $y = $ SNORE $= (0,1,0,\cdots,0)$

| UTTERANCE ID (162) | UTTERED SENTENCE (163) | POSTERIOR PROBABILITY OF MEANING INFORMATION (172) |
|---|---|---|
| 9001 | I AM A STUDENT. | SNORE (0.20), HEADACHE (0.0), STOMACHACHE (0.0), ... |
| 9002 | MY SNORE SEEMS TO BE ANNOYING. | SNORE (0.95), HEADACHE (0.0), STOMACHACHE (0.0), ... |
| 9003 | I HAVE A SYMPTOM OF SNORE. | SNORE (0.90), HEADACHE (0.0), STOMACHACHE (0.0), ... |
| 9004 | I HAVE A TERRIBLE HEADACHE. | SNORE (0.0), HEADACHE (0.90), STOMACHACHE (0.20), ... |
| ... | ... | ... |

| UTTERANCE ID (162) | UTTERED SENTENCE (163) | POSTERIOR PROBABILITY OF MEANING INFORMATION (172) |
|---|---|---|
| 9001 | I AM A STUDENT. | SNORE (0.60), HEADACHE (0.0), STOMACHACHE (0.0), ... |
| 9002 | MY SNORE SEEMS TO BE ANNOYING. | SNORE (0.80), HEADACHE (0.20), STOMACHACHE (0.0), ... |
| 9003 | I HAVE A SYMPTOM OF SNORE. | SNORE (0.85), HEADACHE (0.0), STOMACHACHE (0.0), ... |
| 9004 | I HAVE A TERRIBLE HEADACHE. | SNORE (0.0), HEADACHE (0.80), STOMACHACHE (0.20), ... |
| ... | ... | ... |

171

MEANING GENERATION METHOD, MEANING GENERATION APPARATUS, AND STORAGE MEDIUM

BACKGROUND

1. Technical Field

The present disclosure relates to a meaning generation method, a meaning generation apparatus that generate a meaning of an utterance sentence, and a storage medium.

2. Description of the Related Art

A meaning generation technique (an utterance intention generation technique) is a technique to convert utterances having the same meaning to meaning information (a meaning label). More specifically, using a training sentence including a set of expressions having the same meaning and meaning information, learning is performed in terms of features of a word or a phrase occurring frequently and contributing to meaning information (see, for example, Andrew M. Dai, Quoc V. Le, "Semi-supervised Sequence Learning", NIPS 2015). It is also known, in a conventional technique, to learn conversion between character strings using a bilingual training sentence pair including a set of a Japanese sentence and an English sentence having the same meaning (see, for example, Ilya Sutskever, Oriol Vinyals, Quoc Le, "Sequence to Sequence Learning with Neural Networks", NIPS 2014).

However, in these techniques, when an unimportant word having no direct contribution to an intention described in a sentence to be converted occurs at a high frequency, there is a possibility that the unimportant word is incorrectly recognized as an important word. Thus, to achieve a conversion to a correct meaning label, a further improvement is needed.

SUMMARY

One non-limiting and exemplary embodiment provides a meaning generation method, a meaning generation apparatus and a storage medium with improved accuracy.

In one general aspect, the techniques disclosed here feature a meaning generation method in a meaning generation apparatus, the meaning generation method including acquiring first meaning training data including text data of a first sentence that can be an utterance sentence, the first meaning training data also including meaning information associated with the text data of the first sentence and indicating a meaning of the first sentence, acquiring first restatement training data including the text data of the first sentence and text data of a second sentence associated with the text data of the first sentence, the second sentence being a restatement sentence of the first sentence, learning association between the utterance sentence and the meaning information and between the utterance sentence and the restatement sentence, the learning including learning of a degree of importance of a word included in the utterance sentence, the learning performed by applying the first meaning training data and the first restatement training data to a common model, and storing a result of the learning as learning result information.

Thus, the present disclosure provides a meaning generation method or a meaning generation apparatus having improved accuracy in generating meanings.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a meaning training corpus according to an embodiment;

FIG. 5 is a diagram illustrating an example of a restatement training corpus according to an embodiment;

FIG. 7 is a diagram illustrating an example of a vector expression used in inputting and outputting data to or from a neural network according to an embodiment;

FIG. 10 is a diagram illustrating an example of a meaning information table according to an embodiment;

FIG. 11 is a diagram illustrating an example of a meaning information table according to a technique comparative to an embodiment.

DETAILED DESCRIPTION

Figure 1:
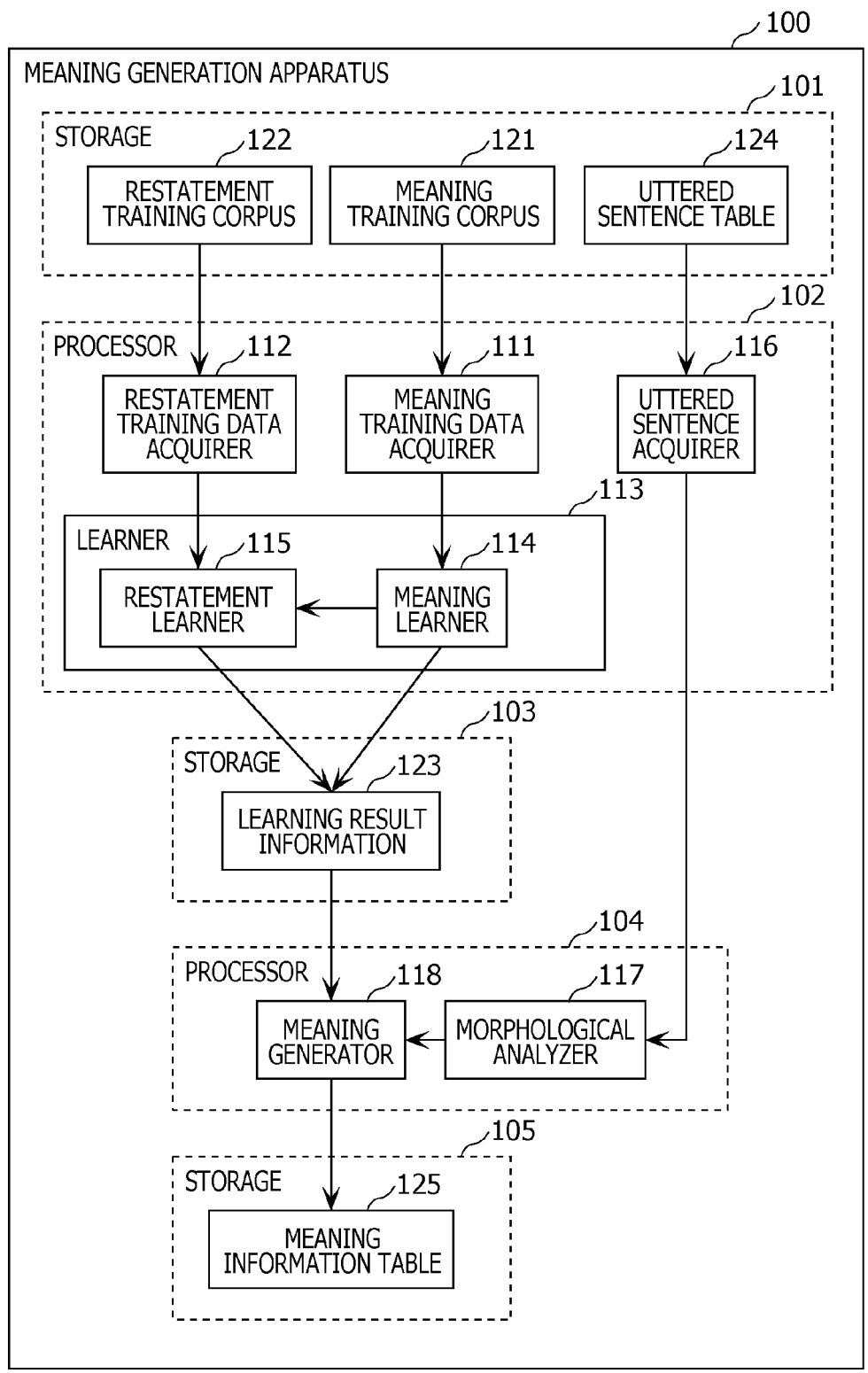
FIG. 1 is a block diagram illustrating a configuration of a meaning generation apparatus according to an embodiment.

Underlying Knowledge Forming Basis of the Present Disclosure

In a technique disclosed in Andrew M. Dai, Quoc V. Le, "Semi-supervised Sequence Learning", NIPS 2015, learning is performed using a neural network model based on a training sentence including a set of a series of words and a label (meaning information), such that a degree of importance of a word or a phrase corresponding to a label is extracted and a label of a polarity (positive, negative) is predicted. In this technique, an LSTM (Long short-term memory) is used which is a subspecific type of recurrent neural network suitable for processing time-series data such as a series of words. This technique can be applied to treat a series of words with an arbitrary long length.

In a technique disclosed in a technical paper written by Ilya Sutskever, Oriol Vinyals, Quoc Le, "Sequence to Sequence Learning with Neural Networks", NIPS 2014, a conversion between two series of words is learned using an LSTM (Long short-term memory) based on a training sentence including a set of two series of words to make it possible to extract words/phrases having strong dependence between series of words. This technique may be applied to, for example, a translation.

To extract important or unimportant words from an utterance of a user, TF-IDF (Term Frequency-Inverse Document Frequency) is widely used as an index based on the number of occurrences of a word in a meaning label and the number of occurrences of a word in a whole language resource.

However, in TF-IDF, an imbalance of describers may cause particular words which occur only in a small number of meaning labels to be regarded as important.

To handle the situation described above, in a technique disclosed in Japanese Patent No. 5362651, structured data available on Web in which task-dependent utterances are described is used. In this technique, utterances are classified by their roles into sentence groups (sections) such as "main body of question", "response sentence", "comment", and the like, and the degree of importance of a word or a phrase is determined taking into account the number of sections in which the word occurs, thereby allowing it to reduce the fluctuation in expressions among describers, and thus making it possible to more properly extract important words.

In a technique disclosed in Katja Filippova, Enrique Alfonseca, Carlos A. Colmenares, Lukasz Kaiser, Oriol Vinyals Google Research, "Sentence Compression by Deletion with LSTMs", Proceedings of the 2015 Conference on Empirical Methods in Natural Language Processing, pages 360-368, degree-of-importance information indicating whether a word is important or not important is assigned to each word in text based on a main body of a news article and text of a title, and a summary of the article is generated thereby making it possible to automatically extract important words.

However, in any of the two techniques disclosed in Japanese Patent No. 5362651, and Katja Filippova, Enrique Alfonseca, Carlos A. Colmenares, Lukasz Kaiser, Oriol Vinyals Google Research, "Sentence Compression by Deletion with LSTMs", Proceedings of the 2015 Conference on Empirical Methods in Natural Language Processing, pages 360-368, it is necessary that sentences to be converted into task-dependent meaning labels should be described in a Web document in a structured form such as "title", "body", "response sentence", "comment", or the like. Therefore, in a case where it is difficult to obtain a Web document in which utterances of a user are described, it is difficult to extract important words.

In view of the problems described above, in an aspect, the present disclosure provides a meaning generation method in a meaning generation apparatus, the meaning generation method including acquiring first meaning training data including text data of a first sentence that can be an utterance sentence, the first meaning training data also including meaning information associated with the text data of the first sentence and indicating a meaning of the first sentence, acquiring first restatement training data including the text data of the first sentence and text data of a second sentence associated with the text data of the first sentence, the second sentence being a restatement sentence of the first sentence, learning association between the utterance sentence and the meaning information and between the utterance sentence and the restatement sentence, the learning including learning of a degree of importance of a word included in the utterance sentence, the learning performed by applying the first meaning training data and the first restatement training data to a common model, and storing a result of the learning as learning result information.

In this method, when an utterance sentence and meaning information are associated with each other, the association between the utterance sentence and the restatement sentence is learned. This makes it possible to enhance the accuracy of association between the utterance sentence and the meaning information.

This meaning generation method may further include, for example, acquiring text data of a third sentence uttered by a user, and generating meaning information associated with the third sentence based on the learning result information.

This makes it possible to generate meaning information from an utterance sentence using a result of learning.

In the meaning generation method, for example, the first meaning training data may be acquired from a first corpus in which two or more pieces of meaning training data are accumulated.

In the meaning generation method, for example, the first restatement training data may be acquired from a second corpus in which two or more pieces of restatement training data are accumulated.

In the meaning generation method, for example, the model may be a neural network model.

For example, the learning may be performed by performing error backpropagation learning between (i) the meaning information and the second sentence associated with the first sentence and (ii) the posterior probability, calculated using the model, for the meaning information and the second sentence corresponding to the first sentence.

In the meaning generation method, for example, the learning of the association between the utterance sentence and the restatement sentence may be performed using internal information obtained in the learning of the association between the utterance sentence and the meaning information.

In the meaning generation method, for example, the model may be a neural network model, and the internal information may be a weight between layers in the neural network model.

In an aspect, the present disclosure provides a meaning generation apparatus including a meaning training data acquirer that acquires first meaning training data including text data of a first sentence that can be an utterance sentence, the first meaning training data also including meaning information associated with the text data of the first sentence and indicating a meaning of the first sentence, a restatement training data acquirer that acquires first restatement training data including the text data of the first sentence and text data of a second sentence associated with the text data of the first sentence, the second sentence being a restatement sentence of the first sentence, a learner that performs learning of association between the utterance sentence and the meaning information and between the utterance sentence and the restatement sentence, the learning including learning of a degree of importance of a word included in the utterance sentence, the learning performed by applying the first meaning training data and the first restatement training data to a common model, and a storage that stores a result of the learning as learning result information.

In this meaning generation apparatus configured in the above-described manner, learning is performed on the association between utterance sentences and restatement sentences when utterance sentences are associated with meaning information, which makes it possible to improve the accuracy in the association between the utterance sentences and the meaning information.

In an aspect, the present disclosure provides a program that causes a computer to execute the meaning generation method described above.

It should be noted that general or specific embodiments may be implemented as a system, a method, an integrated circuit, a computer program, a computer-readable storage medium such as a CD-ROM, or any selective combination thereof.

Embodiments of the present disclosure are described below with reference to drawings. Note that each embodiment described below is for illustrating a specific example of an implementation of the present disclosure. That is, in the following embodiments of the present disclosure, values, shapes, constituent elements, steps, the order of steps, and the like are described by way of example but not limitation. Among constituent elements described in the following embodiments, those constituent elements that are not described in independent claims indicating highest-level concepts of the present disclosure are optional. Also note that a various combinations of part or all of embodiments are possible.

Embodiments

First, a configuration of a meaning generation apparatus 100 according to an embodiment is described. FIG. 1 is a block diagram illustrating a configuration of the meaning generation apparatus 100 according to the embodiment.

This meaning generation apparatus 100 generates a meaning of an utterance sentence. The meaning generation apparatus 100 is realized, for example, by a computer including a storage 101, a processing unit 102, a storage 103, a processing unit 104 and a storage 105.

The storages 101, 103, and 105 are each realized, for example, by a rewritable non-transitory memory such as a hard disk drive, a solid-state drive, or the like.

The storage 101 stores a meaning training corpus 121, a restatement training corpus 122, and an utterance sentence table 124. The storage 103 stores learning result information 123. The storage 105 stores a meaning information table 125.

The processing units 102 and 104 are each realized by a processor such as a CPU, an ASIC, an FPGA, or the like. The processing unit 102 includes a learner 113. The learner 113 includes a meaning learner 114 and a restatement learner 115. The processing unit 104 includes a morphological analyzer 117 and a meaning generator 118.

Each processing block included in the processing units 102, 104, and 105 is realized by a processor such as a CPU or the like by executing a computer-readable program stored in a computer.

Figure 2:
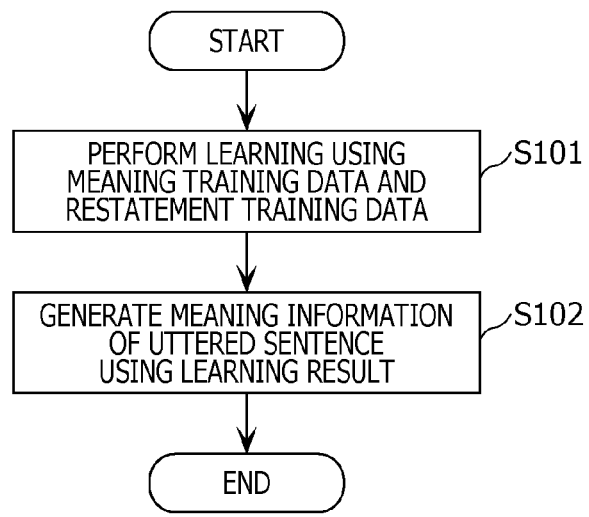
FIG. 2 is a flow chart of a process performed by a meaning generation apparatus according to an embodiment.

Next, an operation of the meaning generation apparatus 100 is described. FIG. 2 is a flow chart illustrating an outline of the operation of the meaning generation apparatus 100.

First, the meaning generation apparatus 100 performs a learning process to learn a correspondence relationship between an utterance sentence and meaning information using a plurality of pieces of meaning training data included in the meaning training corpus 121 and a plurality of pieces of restatement training data included in the restatement training corpus 122 (S101).

Next, the meaning generation apparatus 100 performs a meaning generation process to generate meaning information of an utterance sentence using a result of the learning process (S102).

Figure 3:
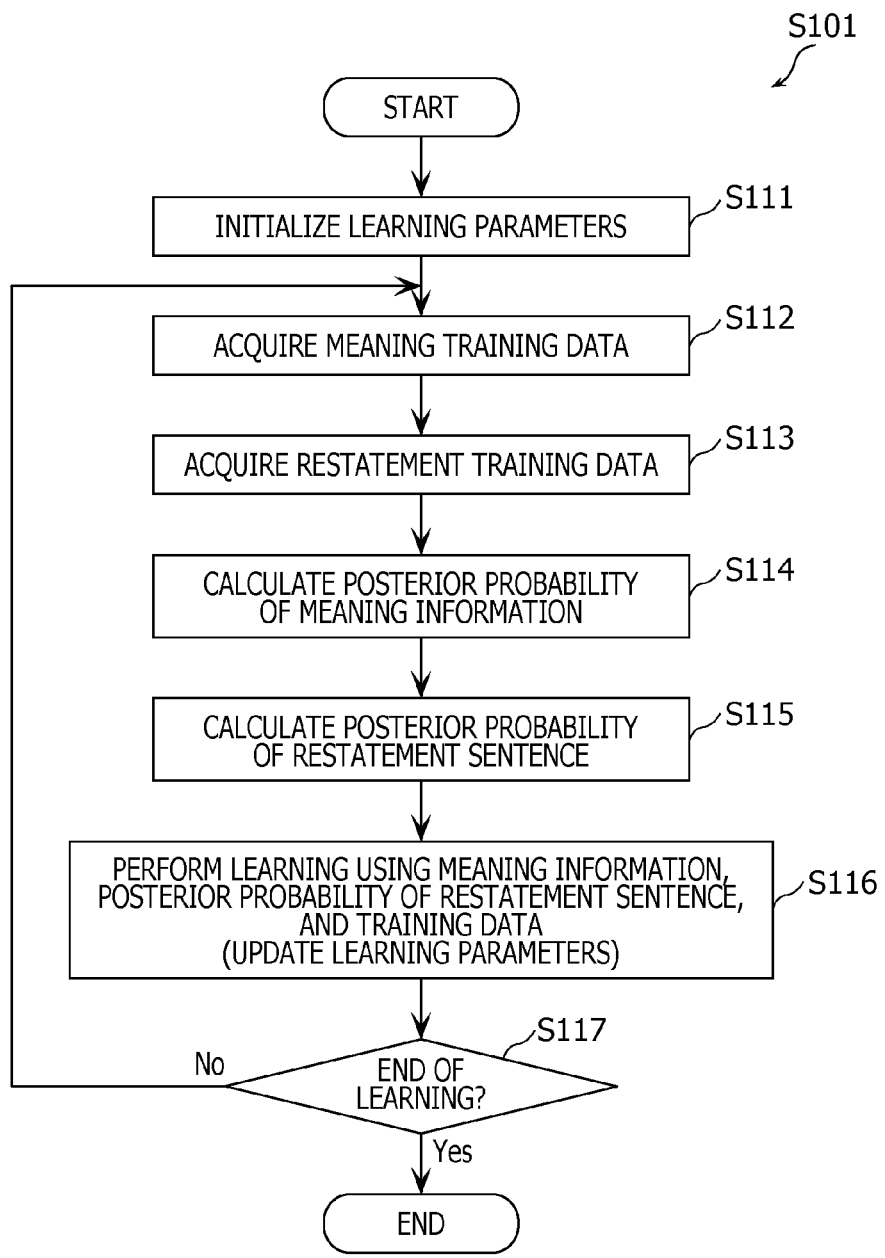
FIG. 3 is a flow chart of a learning process according to an embodiment.

The learning process (S101) is described in further detail below. FIG. 3 is a flow chart of the learning process (S101) according to the present embodiment.

First, the learner 113 initializes all learning parameters based on a pseudorandom number table (S111). More specifically, the learner 113 initializes weights between layers in a neural network shown in FIG. 6 described later.

Next, the meaning training data acquirer 111 acquires one of the plurality of pieces of meaning training data 131 included in the meaning training corpus 121 (S112). FIG. 4 is a diagram illustrating an example of the meaning training corpus 121. In the meaning training corpus 121, as illustrated in FIG. 4, two or more pieces of meaning training data 131 are accumulated. Each piece of meaning training data 131 includes a sentence 134, which is text data of a sentence that can be an utterance sentence, a sentence ID 133 which is an identifier uniquely identifying this piece of meaning training data 131, and meaning information 132 (meaning label) which is a training data indicating a meaning of the sentence 134. That is, meaning training data 131 is data that associates the sentence 134 and the meaning information 132 with each other.

In the case of Japanese, in general, text data is described in the form of a character string having no word delimiters. By using morphological analysis software (such as MeCab), it is possible to obtain series-of-words data in a word-segmented form from character string data described in the form in which there are no word delimiters. Thus, the text data is divided into words in order of occurrence and a result is stored as the sentence 134.

In the example shown in FIG. 4, the meaning training corpus 121 includes response sentences uttered by a patient that may occur in an inquiry. The meaning training data acquirer 111 sequentially acquires meaning training data 131 (meaning information 132 and sentence 134) by incrementing the sentence ID 133. When the sentence ID 133 reaches its end, the meaning training data acquirer 111 returns the sentence ID 133 to its starting value and acquires meaning training data 131 from the beginning.

Next, the restatement training data acquirer 112 acquires one of the plurality of restatement training data 141 included in the restatement training corpus 122 (S113). FIG. 5 is a diagram illustrating an example of the restatement training corpus 122. As shown in FIG. 5, the restatement training corpus 122 includes two or more pieces of restatement training data 141 accumulated therein. Each piece of restatement training data 141 includes a sentence ID 133, a sentence 134, and a restatement sentence set 142 including text data of restatement sentences. Note that each restatement sentence in the restatement sentence set 142 is text data of a candidate for a sentence different from the sentence 134 but having the same meaning label as that of the sentence 134 in the meaning training corpus 121. That is, the restatement training data 141 is data that associates the sentence 134 and the restatement sentence set 142 with each other. Note that the sentence ID 133 and the sentence 134 are the same as those included in the meaning training data 131.

The restatement training data acquirer 112 acquires restatement training data 141 which is one of the plurality of pieces of restatement training data 141 included in the restatement training corpus 122 and which includes the same ID 133 as that of the meaning training data 131 acquired in step S112. The restatement training data acquirer 112 selects, at random and based on the pseudorandom number table, one restatement sentence as training data from the restatement sentence candidates described in the restatement sentence set 142 included in the acquired restatement training data 141.

Next, the learner 113 applies the acquired meaning training data 131 and the restatement training data 141 to the common model thereby learning the association between the utterance sentence (sentence 134) and the meaning information 132 and the restatement sentence 142, the learning including learning of a degree of importance of a word included in the utterance sentence (sentence 134). Herein the model is a neural network model 151 described later.

More specifically, the meaning learner 114 performs supervised learning using text data included in the meaning training corpus 121 thereby learning the association between sentences and meaning information taking into account the degree of importance of words/phrases. That is, the meaning learner 114 learns the manner of assigning a probability value of meaning information to each sentence. A principle of this is to extract a word/phrase that occurs frequently for each piece of meaning information and assign the degree of importance thereto, and calculates a probability of each piece of meaning information from a word sequence of a sentence in an integrative manner.

Figure 6:
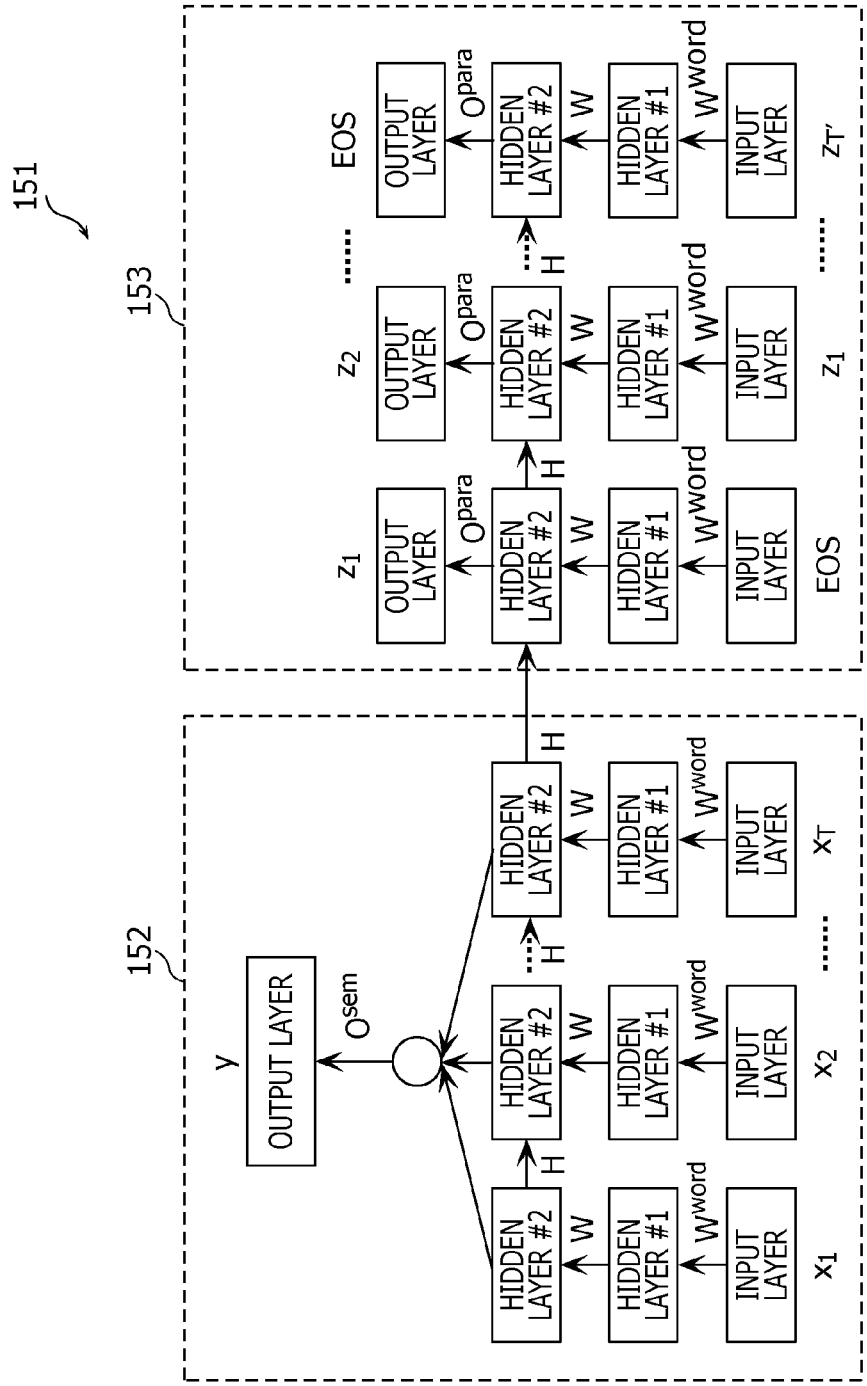
FIG. 6 is a diagram schematically illustrating a neural network according to an embodiment.

FIG. 6 is a diagram schematically illustrating a neural network used by the learner 113 according to the present embodiment. The meaning learner 114 calculates a posterior probability of the meaning information 132 corresponding to the sentence 134 included in the meaning training data 131 acquired in step S112 (S114). For example, for a sentence 134 with a sentence ID 133 of "0002", that is, "a snore occurs" shown in FIG. 4, the posterior probability of the meaning information 132 is calculated using the neural network model 151 shown in FIG. 6.

In FIG. 6, a neural network model 152 used in the meaning learning and a neural network model 153 used in the restatement learning are connected to each other via hidden layers #2 such that one neural network model 151 is formed as a whole. In the present embodiment, the model formed as a whole as a result of connecting a plurality of models for performing different tasks is referred to as a "common model".

Furthermore, the restatement learner 115 calculates a posterior probability of the restatement sentence 142 corresponding to the sentence 134 included in the restatement training data 141 acquired in step S113 (S115). For example, for a sentence with a sentence ID 133 of "0002", that is, "a snore occurs" shown in FIG. 5, the posterior probability of the restatement sentence 142 is calculated using the neural network model 151 shown in FIG. 6.

In this process, the restatement learner 115 performs the restatement learning to convert a sentence to a restatement sentence using internal information (part of the learning parameters) of the meaning learner 114 such that extraction errors of important words by the meaning learner 114 alone are reduced. That is, the learning on the association between utterance sentences (sentences) and restatement sentences is performed using the internal information acquired in the learning on the association between utterance sentences (sentences) and meaning information. More specifically, the internal information is weighting matrices $W^{word}$ and W which are learning parameters used in common in the hidden layer #1 and the hidden layer #2 of the neural network models 152 and 153 shown in FIG. 6. The weighting matrices $W^{word}$ and W represent weights between layers in the neural network model.

More specifically, in the example shown in FIG. 6, internal information is used such that the weights between adjacent layers used by the respective hidden layer #1 and hidden layer #2 in the neural network model 152 used in the meaning learning are used as the weights between adjacent layers by the respective hidden layer #1 and hidden layer #2 in the neural network model 153 used in the restatement learning. Use of the internal information between the neural network model 152 and the neural network model 153 is performed via the hidden layers #2 that connect the neural network model 152 and the neural network model 153 to each other. In other words, the connection between the neural network model 152 and the neural network model 153 via the hidden layers #2 makes it possible to user the internal information between the two models.

In the restatement learning, in principle, in a state in which a sentence and "EOS" indicating the end of the sentence have been time-sequentially input, a first character of the restatement sentence is output, and the utterance sentence, "EOS" indicating the end of the sentence, and the already-output first character of the restatement sentence are input, and a second character of the restatement sentence is output. Again, in a state in which time-sequential inputs are stacked until "EOS" is output, and a next character is output repeatedly.

Next, the learner 113 performs error backpropagation learning (S116) between the training data (the meaning information 132 and the restatement sentence 142) extracted in steps S112 and S113 and the posterior probability calculated in steps S114 and S115. For example, the learner 113 calculates an error using the posterior probability of the meaning information and the restatement sentence, predicted for a sentence "a snore occurs" and vector expressions of meaning information "snore" and a restatement sentence "I have a snore", which are training data. Furthermore, the learner 113 performs the error backpropagation learning so as to reduce, for example, the average of the errors, that is, the error between the posterior probability of the meaning information and the training data and the error between the posterior probability of the restatement sentence and the training data.

The learner 113 determines whether the learning process is to be ended (S117). For example, when no reduction in the error occurs even if the learning is further repeated, the learner 113 determines that the learning process is to be ended.

In a case where it is determined that the learning process is not to be ended (No in S117), the process from step S112 is performed again on next meaning training data 131. In a case where it is determined that the learning process is to be ended (Yes in S117), learning result information 123 indicating a result of the learning process is stored in the storage 103. Note that the learning result information 123 represents learning parameters as of when the learning process is ended.

The learning process using the neural network model 151 is described in further detail below. FIG. 7 is a diagram illustrating an example of a vector expression used in inputting and outputting data to or from the neural network model 151 according to the present embodiment.

First, in the learning, a sentence to be input is represented using a vocabulary dimension vector including several words included in the sentence as shown in FIG. 7. In the vocabulary dimension vector, only an element corresponding to an identification number (1 to a value corresponding to the number of words) assigned to a word is equal to 1, and the remaining elements are all equal to 0. For example, the identification number of a word "I" is 4, the vocabulary dimension vector for this word is given by (0, 0, 0, 1, . . . ). That is, one sentence is expressed by a matrix in which vocabulary dimension vectors are time-sequentially arranged.

Furthermore, in the learning, meaning information to be output is expressed by a label vector whose number of dimension is equal to the number of defined pieces of the meaning information as shown in FIG. 7. In the label vector, only element corresponding to an identification number (1 to the number of defined pieces of meaning labels) assigned to a meaning label is equal to 0, and the remaining elements are equal to 0. In FIG. 7, $x_1$ to $x_3$ are a series of words forming a sentence, y is meaning information, and $z_1$ to $z_6$ are a series of words forming a restatement sentence.

The neural network model 151 shown in FIG. 6 is a recurrent neural network that includes four layers from an input layer to an output layer, and that receives a sentence in the form of time-sequential data as an input. An excellent feature of the recurrent neural network is that provision of a module called a storage unit makes it possible to learn a long-term dependency. The purpose of this neural network model 151 is to minimize the cross-entropy error described in equation (1) and equation (2) shown below.

$$L1 = -\sum_{k=0}^{K} \{t_k \log P(Y = y_k | x_1, \ldots, x_T; \theta) + \quad (1)$$
$$(1 - t_k)\log(1 - P(Y = y_k | x_1, \ldots, x_T; \theta))\}$$

$$L2 = -\log P(z_1, \ldots, z_{T'} | x_1, \ldots, x_T; \theta) \quad (2)$$

In equation (1), $P(Y=y_k|x_1, \ldots x_T; \theta)$ represents the posterior probability of each meaning information for a sentence. In equation (2), $P(z_1, \ldots z_{T'}|x_1, \ldots x_T; \theta)$ represents the posterior probability of a restatement sentence that is training data for the sentence. $x_1$ to $x_T$ are sentences, y is meaning information, and $z_1$ to $z_{T'}$ are restatement sentences. $\theta$ represents all learning parameters of the neural network. To minimize the errors represented by equation (1) and equation (2), the learner 113 updates $\theta$ by the error backpropagation algorithm.

In the example shown in FIG. 6, the neural network model 152 used in the meaning learning and the neural network model 153 used in the restatement learning are connected to each other via the hidden layers #2. In this configuration, all learning parameters are updated such that the error of the posterior probability of each meaning information and the error of the posterior probability of the restatement sentence are both minimized, and the result of the restatement learning is reflected in the learning parameters of the neural network model 152 used in the meaning learning.

Next, the flow of the process performed the neural network to determine each posterior probability is described below. First, when data is transferred from the input layer to the hidden layer #1 shown in FIG. 6, the learner 113 converts $x_t$, EOS, and $z_t$ represented in vocabulary dimension vectors to variance vectors $v_t$ with a reduced number of dimension by using a weighting matrix $W^{word}$ according to equation (3).

$$v_t = W^{word} x_t \quad (3)$$

Next, as shown in equations (4) to (7), when data is transferred from the hidden layer #1 to the hidden layer #2 shown in FIG. 6, the learner 113 multiplies the variance vector by four weighting matrices $W_i$, $W_c$, $W_f$, and $W_o$, multiplies the output $h_{t-1}$ from the immediately previous hidden layer #2 by weighting matrices $H_i$, $H_c$, $H_f$, and $H_o$, and further adds bias terms $b_i$, $b_c$, $b_f$, and $b_o$. The result of this is substituted as an argument of a sigmoid function, which is an activation function, thereby calculating four vectors $i_t$, $\tilde{c}_t$ (on the left side of equation (5)), $f_t$, and $o_t$, whose elements take a value from 0 to 1.

$$i_t = \sigma(W_i v_t + H_i h_{t-1} + b_i) \quad (4)$$

$$\tilde{c}_t = \sigma(W_c v_t + H_c h_{t-1} + b_c) \quad (5)$$

$$f_t = \sigma(W_f v_t + H_f h_{t-1} + b_f) \quad (6)$$

$$o_t = \sigma(W_o v_t + H_o h_{t-1} + b_o) \quad (7)$$

Note that $i_t$, $\tilde{c}_t$, $f_t$, and $o_t$ are vectors for controlling the storage units, and more specifically, these vectors respectively control memory inputting, input memory cell $\tilde{c}_t$, memory forgetting, and memory outputting.

Next, as shown in equation (8), the learner 113 updates the value of the memory cell $c_t$ possessed by the neural network using the input control vector $i_t$, the input memory cell $\tilde{c}_t$, the forgetting control vector $f_t$, and the previous value of the memory unit $c_{t-1}$.

$$c_t = i_t * \tilde{c}_t + f_t * c_{t-1} \quad (8)$$

Next, as shown in equation (9), the learner 113 calculates the output $h_t$ of the current hidden layer #2 from the output control vector $o_t$ and the memory cell $c_t$.

$$h_t = o_t * \tan h(c_t) \quad (9)$$

The process according to equations (2) to (7) is a process peculiar, peculiar to the LSTM which is a subspecific type of recurrent neural network, performed to learn long-term dependence relationship between the time-series input and the output.

Furthermore, when data is transferred from the hidden layer #2 to the output layer in the neural network model 152 shown in FIG. 6, the mean vector of $h_1^{sem}$ to $h_T^{sem}$ obtained from input of $x_1$ to $x_T$ is obtained according to equation (10).

$$\bar{h} = \frac{1}{T} \sum_{t=1}^{T} h_t^{sem} \quad (10)$$

The learner 113 then multiplies the mean vector by a weighting matrix $O^{sem}$ and further adds a bias term $b^{sem}$ as shown in equation (11) thereby calculating $o^{sem}$.

$$o^{sem} = O^{sem} \bar{h} + b^{sem} \quad (11)$$

Note that $o^{sem}$ is a vector whose number of dimension is equal to the number of defined pieces of meaning labels. By substituting each element as an argument of the sigmoid function ($\sigma$) shown in equation (12), it is possible to obtain a prediction probability vector represented by a probability value, from 0 to 1, as to whether each meaning label is included or not.

$$\sigma(a) = \frac{1}{1 + e^{-a}} \quad (12)$$

One element of the prediction probability vector indicates $P(Y=y_k|x_1, \ldots x_T; \theta)$ in the loss function of equation (1).

When data is transferred from the hidden layer #2 to the output layer in the neural network model 153 shown in FIG. 6, $h_1^{para}$ to $h_{T'}^{para}$ obtained from inputs EOS, $z_1$ to $Z_{T'}$ are multiplied by a matrix $O^{para}$ and a bias term $b^{para}$ is added to the result thereby obtaining $o_t^{para}$ as shown in equation (13).

$$o_t^{para} = O^{para} h_t^{para} + b^{para} \quad (13)$$

Note that $o_t^{para}$ is a vector whose number of dimension is equal to the number of vocabulary words. By substituting each element as an argument of the softmax function shown in equation (14), it is possible to obtain a vector representing a probability distribution of a predicted word.

$$\text{softmax}(a_k) = \frac{e^{a_k}}{\sum_{i=0}^{K} e^{a_i}} \quad (14)$$

An element corresponding to training data in the probability distribution indicates $P(z_t|c, z_1, \ldots z_{t-1}; \theta)$ in equation (15) where c is a context vector indicating $hT^{sem}$.

$$P(z_1, \ldots, z_{t'}|x_1, \ldots, x_T; \theta) = \prod_{t=1}^{t'} P(z_t | c, z_1, \ldots z_{t-1}) \quad (15)$$

Via the process described above, the posterior probability of the meaning information and the posterior probability of the restatement sentence are calculated using the neural network model 151 shown in FIG. 6. Note that, in a meaning generation process (S102) described later, only the neural network model 152 is used, and thus only learning parameters used in the neural network model 152 may be stored as the learning result information 123. That is, as the learning result information 123, the correspondence between the sentence obtained as the result of the learning and the meaning information may be stored.

Note that the learning result information 123 includes the degree of importance of the word/phrase obtained as the result of the learning. More specifically, the weighting matrices $W^{word}$, W, and the like described above indicate degree of importance of the words/phrases.

Figures 8, 9:
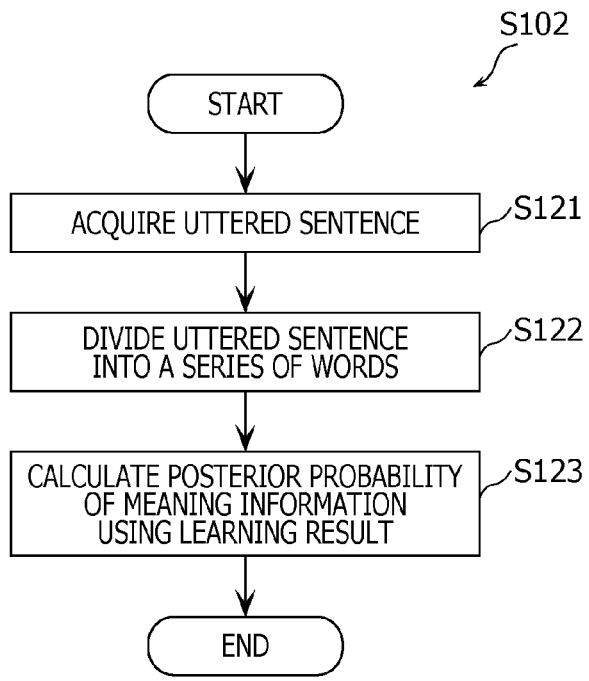
FIG. 8 is a flow chart of a meaning generation process according to an embodiment.
FIG. 9 is a diagram illustrating an example of an utterance sentence table according to an embodiment.

Next, the meaning generation process (S102 in FIG. 2) is described in further detail below. FIG. 8 is a flow chart of the meaning generation process (S102) according to the present embodiment.

First, the utterance sentence acquirer 116 acquires one of the plurality of pieces of utterance sentence data 161 included in the utterance sentence table 124 (S121). FIG. 9 is a diagram illustrating an example of an utterance sentence table 124. As shown in FIG. 9, the utterance sentence table 124 includes a plurality of pieces of utterance sentence data 161. Each piece of utterance sentence data 161 includes an utterance ID 162 which is an identifier uniquely identifying the utterance sentence data 161 and an utterance sentence 163 which is text data of a sentence uttered by a user.

Next, the meaning generation apparatus 100 generates meaning information corresponding to the utterance sentence 163 based on the learning result information 123. First, the morphological analyzer 117 divides the utterance sentence 163, which is a character string described without delimiter between words, into words thereby obtaining series-of-words data (S122). For example, this function may be realized by morphological analysis software (such as MeCab) or the like.

Next, the meaning generator 118 calculates the posterior probability indicating the likelihood of each meaning information using the series-of-words data obtained in step S122 (S123). More specifically, the meaning generator 118 calculates the posterior probability of the meaning information by inputting the series-of-words data acquired in step S122 to the neural network model 152 to which the learning parameters stored in the learning result information 123 are applied. The calculated meaning information is stored in the meaning information table 125.

The sequence of processes shown in FIG. 8 is performed sequentially on a plurality of pieces of utterance sentence data 161 included in the utterance sentence table 124, and meaning information corresponding to each piece of utterance sentence data 161 is stored in the meaning information table 125.

FIG. 10 is a diagram illustrating an example of a meaning information table 125 generated using the method according to the present embodiment. FIG. 11 is a diagram illustrating, for comparison, an example of a meaning information table 125A which is obtained when only learning on the meaning information is performed without performing learning on the restatement sentence.

The meaning information table 125 includes, as shown in FIG. 10, a plurality of pieces of meaning information data 171. Each piece of meaning information data 171 includes an utterance ID 162, an utterance sentence 163, and a posterior probability 172 of meaning information. The utterance ID 162 and the utterance sentence 163 are the same as those included in the utterance sentence table 124. The posterior probability 172 represents the posterior probability calculated in step S123. More specifically, the posterior probability 172 represents a probability for each of the plurality of meaning information. That is, the posterior probability 172 is an example of information indicating meaning information of the utterance sentence 163.

In a case where learning of restatement sentences is not performed, as in the case shown in FIG. 11, the posterior probabilities for an utterance sentence "I am a student" is 0.60 for "snore", 0.00 for "headache", and 0.00 for "stomachache". Note that the sum of probabilities is not equal to 1 in this example. Also note that the probability may be close to 1 for each of a plurality of pieces of meaning information. In a case where the posterior probability is larger than a particular threshold value (for example, 0.5), it is determined that the utterance sentence has a meaning indicated by the meaning information. On the other hand, in a case where the posterior probability is not larger than the threshold value, it is determined that the utterance does not have a relation to meaning information.

As shown in FIG. 11, in the case where no learning on restatement sentences is performed, when an expression "I have a snore" is learned as "snore", the degree of importance of "I" included in this expression is high. As a result, for an utterance such as "I am a student" or the like including "I" which has no relation to "snore", the posterior probability of meaning information "snore" becomes high.

In contrast, in the case where learning on restatement sentences is performed according to the present embodiment, as shown in FIG. 10, the probability value of a meaning label of "snore" is low for an utterance such as "I am a student" which has no relation to "snore". As described above, the meaning generation apparatus 100 according to the present embodiment makes it possible to perform learning so as to increase the degree of importance for words/phrases common among describers by performing the learning using restatement sentences each including a pair of series of words having the same meaning in addition to the learning on meaning information. This makes it possible to correctly understand an intention of a user.

In the present embodiment, as described above, the learning is performed on conversion from a sentence, which can be an utterance sentence, to a sentence (restatement sentence) having the same meaning. This learning is performed using the fact that words/phrases strongly dependent on each other are extracted. For example, a content word such as "snore" is strongly dependent on a synonym in an original sentence before a restatement is performed. On the other hand, "I" or "since yesterday" can be omitted, and thus these words/phrases do not have strong dependence on any word/phrase in the original non-restated sentence. Therefore, it is possible to set content words or the like as important words/phrases and other words as unimportant words/phrases, which makes it possible to extract important words/phrases having more significant contributions to meanings.

In the above explanation, it is assumed by way of example that the meaning training corpus 121 includes a plurality of pieces of meaning training data 131, the restatement training corpus 122 includes a plurality of pieces of restatement training data 141, and the utterance sentence table 124 includes a plurality of pieces of utterance sentence data 161. However, at least one of these may include only one piece of meaning training data 131, restatement training data 141, or utterance sentence data 161.

Furthermore, in the above explanation, it is assumed by way of example that the meaning generation apparatus 100 performs both the learning process and the meaning generation process. However, these processes may be performed by different apparatuses.

Figure 12:
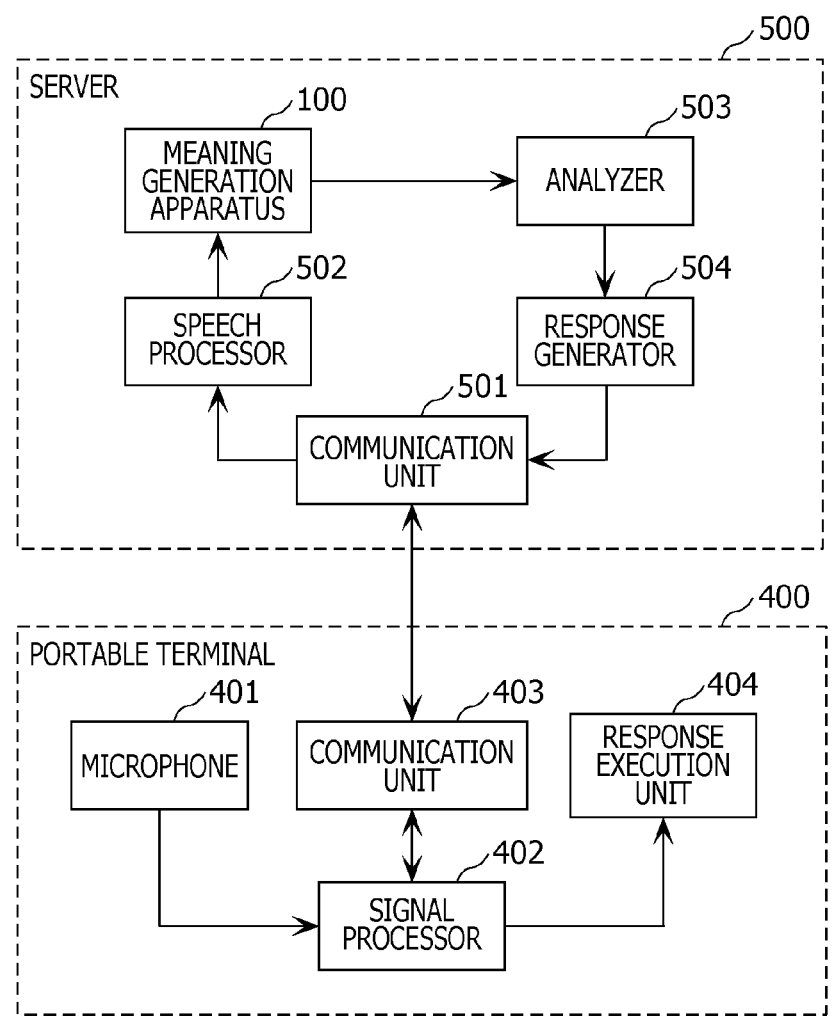
FIG. 12 is a block diagram of a dialogue system according to an embodiment.

Next, a manner of using the meaning generation apparatus 100 is described. FIG. 12 is a block diagram of a dialogue system including the meaning generation apparatus 100. This dialogue system has a function of speech recognition, and includes a server 500 located on a cloud and a portable terminal 400 such as a smartphone or the like. A user is allowed to voice-talk with the system using a natural language via the portable terminal 400.

The portable terminal 400 and the server 500 are connected to each other, for example, via public communication network such as the Internet or the like. The portable terminal 400 may be a smartphone, a tablet, or the like.

The portable terminal 400 includes a microphone 401, a signal processor 402, a communication unit 403, and a response execution unit 404. The microphone 401 is device that convers a voice to an electric voice signal, and is used to detect a voice of a user.

The signal processor 402 determines whether a voice signal input via the microphone 401 is noise or not. In a case where the input voice signal is not noise, the signal processor 402 outputs the voice signal to the communication unit 403.

The communication unit 403 converts the input voice signal to a communication signal in a format allowed to be transmitted, and transmits the resultant communication signal to the server 500.

The response execution unit 404 displays, on a monitor, a response sentence that the signal processor 402 receives from the communication unit 403.

The server 500 includes a meaning generation apparatus 100, a communication unit 501, a speech processor 502, an analysis unit 503, and a response generator 504. The communication unit 501 receives the communication signal from the portable terminal 400, extracts the voice signal from the communication signal, and outputs the extracted voice signal to the speech processor 502.

The speech processor 502 analyzes the extracted voice signal and generates text data representing the voice uttered by the user.

The meaning generation apparatus 100 is, for example, the meaning generation apparatus 100 shown in FIG. 1, and is in a state in which the learning process described above has been completed. The meaning generation apparatus 100 adds the text data generated by the speech processor 502 to the utterance sentence table 124 and performs the meaning generation process described above thereby adding the meaning information of the text data to the meaning information table 125.

The analysis unit 503 receives the meaning information (the probability value) corresponding to the content uttered by a user from the meaning generation apparatus 100 and determines whether the utterance can be understood by the system or not. In a case where the content of the utterance of the user can be understood, the analysis unit 503 transfers the content of the utterance to the response generator 504.

The response generator 504 generates a response sentence corresponding to the received utterance content. The communication unit 501 converts the generated response sentence to a communication signal in a format allowed to be transmitted, and transmits the resultant communication signal to the portable terminal 400.

In the dialogue system shown in FIG. 12, as described above, the server 500 is capable of correctly understanding the utterance of a user and responding thereto using the meaning generation apparatus 100 that has already performed the learning described above.

The meaning generation apparatus has been described above with reference to the specific embodiments. However, the meaning generation apparatus according to the present disclosure is not limited to these embodiments.

Each of the processing units in the meaning generation apparatus according to any one of the embodiments described above may be typically implemented by an integrated circuit such as an LSI. The LSI may be individually formed as chips, or one chip may be formed so as to include a part or all of the processing units.

However, the technique of implementing an integrated circuit is not limited to the LSI and may be realized by using a dedicated circuit or a general-purpose processor. An FPGA (Field Programmable Gate Array) that can be programmed after the manufacture of the LSI or a reconfigurable processor in which the connections and the settings of circuit cells disposed inside the LSI can be reconfigured may be used.

The present disclosure may be implemented as a meaning generation method executed by a meaning generation apparatus.

In each embodiment described above, each constituent element may be realized using dedicated hardware or may be realized by executing software program corresponding to the constituent element. Each constituent element may be realized by a program execution unit such as a CPU, a process or the like by reading software program stored in a storage medium such a hard disk, a semiconductor memory, or the like and executing the software program.

Note that the manners of dividing the meaning generation apparatus into functional blocks shown in block diagrams are merely examples. A plurality of functional blocks may be combined together into one functional block, or one functional block may be divided into a plurality of functional block. A part of function may be transferred to another functional block. Functions of a plurality of functional blocks having similar functions may be executed by single hardware or may be executed by software in parallel or in a time-sharing manner.

The orders of executing the steps described in flow charts are merely examples that may be employed to realize the present disclosure, and the order may be different from those employed in these examples. Part of the steps may be performed concurrently (in parallel) with other steps.

The meaning generation apparatus according to one or more embodiments has been described above. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

The present disclosure may be applied to a meaning generation apparatus and usable in a task-oriented dialogue system or a dialogue system method such as a call center, an inquiry dialogue, or the like, in which, for example, a task of a user is achieved by performing a response based on an utterance in a voice or text given by the user.

What is claimed is:

1. A meaning generation method in a meaning generation apparatus, the meaning generation method comprising:
   initializing learning parameters, by one or more processors, based on a pseudorandom number table stored in the one or more memories;
   acquiring first meaning training data by the one or more processors from the one or more memories, including text data of a first sentence that is an utterance sentence, the first meaning training data also including meaning information associated with the text data of the first sentence and indicating a meaning of the first sentence;
   acquiring first restatement training data by the one or more processors from the one or more memories, including the text data of the first sentence and text data of a second sentence associated with the text data of the first sentence, the second sentence being a restatement sentence of the first sentence;
   learning association, by the one or more processors, between the utterance sentence and the meaning information and between the utterance sentence and the restatement sentence, the learning including learning of a degree of importance of a word included in the utterance sentence, the learning performed by applying the first meaning training data and the first restatement training data to a neural network model;
   storing, by the one or more processors in the more or more memories, a result of the learning as learning result information,
   acquiring text data, by the one or more processors, of a third sentence uttered by a user; and
   generating meaning information, by the one or more processors corresponding to the third sentence based on the learning result information stored in the one or more memories,
   wherein the learning of association between the utterance sentence and the restatement sentence is performed using internal information obtained in the learning of the association between the utterance sentence and the meaning information, and
   wherein the internal information is a weight between layers in the neural network model.

2. The meaning generation method according to claim 1, wherein the first meaning training data is acquired from a first corpus in which two or more pieces of meaning training data are accumulated.

3. The meaning generation method according to claim 1, wherein the first restatement training data is acquired from a second corpus in which two or more pieces of restatement training data are accumulated.

4. The meaning generation method according to claim 1, wherein the learning is performed by performing error backpropagation learning between (i) the meaning information and the second sentence associated with the first sentence, and (ii) the posterior probability, calculated using the neural network model, for the meaning information and the second sentence corresponding to the first sentence.

5. A meaning generation apparatus, comprising:
   one or more processors;
   one or more memories;
   an initializer that initializes learning parameters based on a pseudorandom number table stored in the one or more memories;
   a meaning training data acquirer that acquires first meaning training data including text data of a first sentence that is an utterance sentence, the first meaning training data also including meaning information associated with the text data of the first sentence and indicating a meaning of the first sentence;
   a restatement training data acquirer that acquires first restatement training data including the text data of the first sentence and text data of a second sentence associated with the text data of the first sentence, the second sentence being a restatement sentence of the first sentence;
   a learner that performs learning of association between the utterance sentence and the meaning information and between the utterance sentence and the restatement sentence, the learning including learning of a degree of importance of a word included in the utterance sentence, the learning performed by applying the first meaning training data and the first restatement training data to a neural network model,
   wherein the one or more processors store a result of the learning as learning result information in the one or more memories,
   wherein the one or more processors acquires text data of a third sentence uttered by a user,
   wherein the one or more processors generates meaning information corresponding to the third sentence based on the learning result information stored in the one or more memories,
   wherein the learning of association between the utterance sentence and the restatement sentence is performed using internal information obtained in the learning of the association between the utterance sentence and the meaning information, and
   wherein the internal information is a weight between layers in the neural network model.

6. A non-transitory computer-readable storage medium storing a program causing a computer to execute a process, comprising:
   initializing learning parameters, by one or more processors, based on a pseudorandom number table stored in one or more memories;
   acquiring first meaning training data by the one or more processors from the one or more memories, including text data of a first sentence that is an utterance sentence, the first meaning training data also including meaning information associated with the text data of the first sentence and indicating a meaning of the first sentence;
   acquiring first restatement training data by one or more processors from one or more memories, including the text data of the first sentence and text data of a second sentence associated with the text data of the first sentence, the second sentence being a restatement sentence of the first sentence;
   learning association, by the one or more processors, between the utterance sentence and the meaning information and between the utterance sentence and the restatement sentence, the learning including learning of a degree of importance of a word included in the utterance sentence, the learning performed by applying the first meaning training data and the first restatement training data to a neural network model;

storing, by the one or more processors in the more or more memories, a result of the learning as learning result information, acquiring text data, by the one or more processors, of a third sentence uttered by a user; and generating meaning information, by the one or more processors corresponding to the third sentence based on the learning result information stored in the one or more memories, wherein the learning of association between the utterance sentence and the restatement sentence is performed using internal information obtained in the learning of the association between the utterance sentence and the meaning information, and wherein the internal information is a weight between layers in the neural network model.

* * * * *